(12) United States Patent
Lines et al.

(10) Patent No.: US 7,934,031 B2
(45) Date of Patent: Apr. 26, 2011

(54) RESHUFFLED COMMUNICATIONS PROCESSES IN PIPELINED ASYNCHRONOUS CIRCUITS

(75) Inventors: Andrew M. Lines, Calabasas, CA (US);
Alain J. Martin, Pasadena, CA (US);
Uri Cummings, Oak Park, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/433,203

(22) Filed: May 11, 2006

(65) Prior Publication Data
US 2006/0212628 A1 Sep. 21, 2006

Related U.S. Application Data

(63) Continuation of application No. 10/294,044, filed on Jul. 18, 2001, now abandoned, which is a continuation of application No. 09/501,638, filed on Feb. 10, 2000, now abandoned, which is a continuation of application No. 09/360,468, filed on Jul. 22, 1999, now abandoned.

(60) Provisional application No. 60/093,840, filed on Jul. 22, 1998.

(51) Int. Cl.
*G06F 13/00* (2006.01)
*G06F 15/76* (2006.01)
*H03K 19/00* (2006.01)
*H03K 19/173* (2006.01)
*G11C 7/10* (2006.01)

(52) U.S. Cl. .......... 710/100; 710/1; 710/52; 712/1; 712/10; 712/11; 712/220; 712/219; 712/225; 708/233; 708/508; 326/38; 326/41; 370/298; 377/66; 377/70; 377/73; 377/74; 377/75; 377/79; 377/81; 365/189.011; 365/189.04; 365/189.05; 365/189.14; 365/189.15; 365/189.16; 716/1

(58) Field of Classification Search .............. None
See application file for complete search history.

(56) References Cited

U.S. PATENT DOCUMENTS

| | | | |
|---|---|---|---|
| 3,290,511 A * | 12/1966 | Sims, Jr. ............... | 307/401 |
| 4,680,701 A | 7/1987 | Cochran | |
| 4,710,650 A * | 12/1987 | Shoji ................... | 326/98 |
| 4,875,224 A | 10/1989 | Simpson | |
| 4,912,348 A | 3/1990 | Maki et al. | |
| 5,367,638 A | 11/1994 | Niessen et al. | |
| 5,434,520 A | 7/1995 | Yetter et al. | |

(Continued)

FOREIGN PATENT DOCUMENTS
WO WO9207361 4/1992

OTHER PUBLICATIONS

Venkat et al., "Timing Verification of Dynamic Circuits", May 1, 1995, IEEE 1995 Custom Integrated Circuits Conference.

(Continued)

*Primary Examiner* — Tanh Q Nguyen
(74) *Attorney, Agent, or Firm* — Weaver Austin Villeneuve and Sampson LLP

(57) ABSTRACT

An asynchronous logic family of circuits which communicate on delay-insensitive flow-controlled channels with 4-phase handshakes and 1 of N encoding, compute output data directly from input data using domino logic, and use the state-holding ability of the domino logic to implement pipelining without additional latches.

16 Claims, 7 Drawing Sheets

U.S. PATENT DOCUMENTS

| | | | |
|---|---|---|---|
| 5,440,182 A | | 8/1995 | Dobbelaere |
| 5,479,107 A | | 12/1995 | Knauer |
| 5,544,342 A | * | 8/1996 | Dean .............................. 711/119 |
| 5,572,690 A | | 11/1996 | Molnar |
| 5,666,532 A | | 9/1997 | Saks et al. |
| 5,732,233 A | | 3/1998 | Klim et al. |
| 5,737,614 A | * | 4/1998 | Durham et al. ............... 713/322 |
| 5,752,070 A | | 5/1998 | Martin et al. |
| 5,802,331 A | | 9/1998 | Van Berkel |
| 5,889,979 A | | 3/1999 | Miller, Jr. et al. |
| 5,918,042 A | | 6/1999 | Furber |
| 5,920,899 A | | 7/1999 | Chu |
| 5,949,259 A | | 9/1999 | Garcia |
| 5,973,512 A | | 10/1999 | Baker |
| 6,038,656 A | | 3/2000 | Martin et al. |
| 6,044,453 A | * | 3/2000 | Paver ............................. 712/201 |
| 6,049,882 A | * | 4/2000 | Paver ............................. 713/322 |
| 6,055,620 A | * | 4/2000 | Paver et al. .................... 712/201 |
| 6,152,613 A | | 11/2000 | Martin et al. |
| 6,301,655 B1 | | 10/2001 | Manohar et al. |
| 6,381,692 B1 | | 4/2002 | Martin et al. |
| 6,502,180 B1 | | 12/2002 | Martin et al. |
| 6,658,550 B2 | * | 12/2003 | Martin et al. ................... 712/23 |
| 2002/0156995 A1 | * | 10/2002 | Martin et al. ................. 712/201 |

OTHER PUBLICATIONS

Wilson, "Fulcrum IC heats asynchronous design debate", Aug. 20, 2002, http://www.fulcrummicro.com/press/article_eeTimes_08-20-02.shtml.

Martin, "Asynchronous Datapaths and the Design of an Asynchronous Adder", Department of Computer Science California Institute of Technology, Pasadena, California, pp. 1-24.

Martin, "Self-Timed FIFO: An Exercise in Compiling Programs into VLSI Circuit", Computer Science Department California Institute of Technology, pp. 1-21.

A. J. Martin, "Synthesis of Asynchronous VLSI Circuits", Dept. of Computer Science, California Institute of Technology, Pasadena, CA, Aug. 9, 1991, 147 pages.

* cited by examiner

RESHUFFLED COMMUNICATIONS PROCESSES IN PIPELINED ASYNCHRONOUS CIRCUITS

RELATED APPLICATION DATA

The present application is a continuation application of and claims priority under 35 U.S.C. 120 to U.S. patent application Ser. No. 10/294,044 filed on Jul. 18, 2001 (abandoned), which is a continuation of U.S. patent application Ser. No. 09/501,638 filed on Feb. 10, 2000 (abandoned), which is a continuation of U.S. patent application Ser. No. 09/360,468 filed on Jul. 22, 1999 (abandoned), which claims priority under 35 U.S.C. 119(e) to U.S. Provisional Patent Application No. 60/093,840 filed on Jul. 22, 1998, the entire disclosure of each of which is incorporated herein by reference for all purposes.

STATEMENT AS TO FEDERALLY SPONSORED RESEARCH

This application may have received funding under U.S. Government Grant No. DAAH-04-94-G-0274 awarded by the Department of the Army.

BACKGROUND OF THE INVENTION

This specification describes communicating sequential processes (CSP) which are implemented as quasi delay insensitive asynchronous circuits. More specifically the present specification teaches reshuffling communication sequences and combining computation with buffering to produce pipelined circuits.

Asynchronous processors are known as described in U.S. Pat. No. 5,752,050. These processors process an information stream without a global clock synchronizing the operation.

An asynchronous processor pipeline scheme uses the basic layout shown in FIG. 1. A first process 100 communicates with a second process 110 that in turn sends a message to the next process. The messages use a four phase handshake. In the first phase, the sender raises the request line. In the second phase, the receiver raises the acknowledge line. In the third phase, the sender lowers the request line. In the fourth phase, the receiver lowers the acknowledge line. In the handshaking expansion language (HSE), the handshake on channel X is described as X+; Xa+; X−; Xa−. In FIG. 1, the request between 100 and 110 is the L wire (102). The acknowledge for that communication is La (108).

The request between 110 and 120 is the R wire (104), and the acknowledge is Ra (106).

This is a basic request, acknowledge system. The request [L] is acknowledged (La), then acted on R↑, then acknowledged again (Ra).

Pipelined asynchronous circuits are known as "Bundled-Data" or "Micropipelines" and have a synchronous style data path which is "clocked" by asynchronous self-timed control elements. These control elements handshake between pipeline stages with a request/acknowledge pair. The delay of the datapath logic is estimated with a delay-element in the control, so that the request to the next pipeline state is not made until the data is assumed to be valid.

The alternative style involves (quasi) delay-insensitive circuits, for which no delay assumptions are made. In this style, the prior art is embodied in the Caltech Asynchronous Microprocessor patent. Datapaths are still separated from control, as in the bundled-data case, but completion detection circuitry is added instead of delay lines to detect when the data is valid. Communication between processes occurs via delay-insensitive channels with a 4 phase handshake. In between latches or buffers, logic can be performed by unpipelined weak-condition logic blocks.

SUMMARY OF THE INVENTION

The present system teaches a way of pipelining this handshake to allow certain processes to occur closer to simultaneously. The disclosed system is a delay insensitive system that uses a combination of logic and buffering to resequence certain operations.

A new way of pipelining quasi-delay-insensitive circuits is disclosed in which control is not explicitly separated from the datapath. No extra buffers or latches are added between logic blocks. Instead, the state-holding property of a buffer is combined directly with a dual-rail domino logic computation. The tokens travel through the pipeline as in the case of simple buffers. The tokens also carry values which are computed upon. By not separating control from data, and by carefully designing the circuit parts which handle the handshakes, higher throughput is expected. The extra handshake circuitry typically adds no more than 50% area.

The supporting circuitry which handles the handshake takes place in precharge domino logic of a type that is common in synchronous design. Additional circuits detect the validity of the input and output channels (common in asynchronous design). An acknowledge circuit acknowledges the inputs and precharges the logic.

The circuit implementations disclosed in this patent include components for logic computation, plus components to detect the validity of the input and output data, and another component to generate the acknowledges and precharge the logic. The details and composition of these pieces generate fast quasi delay insensitive circuits superior to the prior art.

This patent also includes further enhancements of this combined buffer/logic cell. These include the ability to conditionally communicate on either inputs or outputs, so as to implement routing functionality. Also, mechanisms for efficiently implementing internal state variables are described.

BRIEF DESCRIPTION OF THE DRAWINGS

These and other aspects will now be described in detail with reference to the accompanying drawings, wherein.

DETAILED DESCRIPTION OF SPECIFIC EMBODIMENTS

Figure 1:
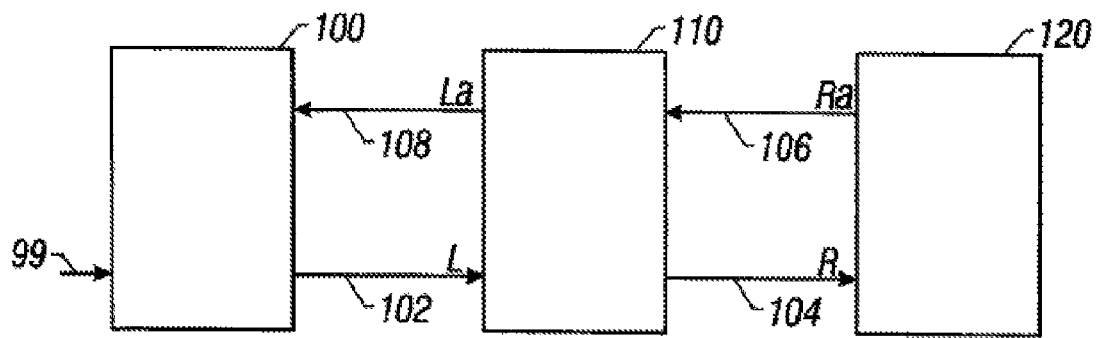
FIG. 1 shows a basic pipelining system and some of the signals used in that system.

The present system is based on a way of pipelining the information in the FIG. 1 drawing using precharge logic that allows the operations to occur in parallel. Pipelining allows a system to carry out more than one operation at the same time. Put another way, a pipelined system does not need to wait for one action to be completed before the other action is carried out. However, if one attempts to reset data before using it, then the data is lost.

The present system teaches a way of dealing with this issue by reshuffling the communication sequence, storing certain information within the sequence, and enabling more efficient pipelining information.

A "pipeline" is a linear sequence of buffers where the output of one buffer connects to the input of the next buffer as shown in FIG. 1. "Tokens" 99 are sent into the input end of the pipeline, and flow through each buffer to the output end. The tokens remain in first-in-first-out (FIFO) order.

For synchronous pipelines, the tokens usually advance through one stage on each clock cycle. For asynchronous pipelines there is no global clock to synchronize the movement. Instead, each token moves forward down the pipeline where there is an empty cell in front of it; otherwise, the token stalls. Effectively, the tokens have similar behavior to cars on a freeway.

The buffer capacity or "slack" of an asynchronous pipeline is proportional to the maximum number of tokens that can be packed into the pipeline without stalling the input end of the pipeline. The "throughput" is the number of tokens per second which pass a given stage in the pipeline. The "forward latency" is the time it takes a given token to travel the length of the pipeline.

Buffer Reshuffling

A single rail buffer has the Communication Sequential Process "CSP" specification *[L;R]. Using a passive protocol for L and a lazy active protocol for R, the buffer will have the handshaking expansion (HSE):

$$*[[L]; L^a\uparrow; [\neg L]; L^a\downarrow; [\neg R^a]; R\uparrow; [R^a]; R\downarrow] \quad (1)$$

in English, the handshaking expansion for this buffer is as follows: Wait for L to become true. Set La true. Wait for L to become false. Set La false. Wait for Ra to become false. Set R true. Wait for Ra to become true. Set R false. Repeat infinitely.

The present system recognizes that certain sequences are the most interesting among these sequences. The present application reshuffles the sequence in order to do these first.

In effect, equation 1 represents a four phase protocol. The first two actions [L]; $L^a\uparrow$, represent waiting for L to become active, and acknowledging that. The second two actions represent L becoming inactive. The third two actions represent waiting for R to become active. The fourth two actions represent R inactive.

The environment will perform $*[[\neg L^a];L\uparrow;[L^a];L\downarrow]$ and $*[[R];R^a\uparrow;[\neg R];R^a\downarrow]$. The wait for L, or [L] is interpreted to be the arrival of an input token, and the transition R ↑ is the beginning of the output token. Buffers are used herein to preserve the desired FIFO order and properties of a pipeline.

Direct implementation of this handshaking expression can use a state variable to distinguish the first half from the second half. This represents a large amount of sequencing in each cycle.

Another option is to reshuffle the waits and events to reduce the amount of sequencing and the number of state variables, in order to maximize the throughput and minimize the latency of the pipeline.

The first requirement for a valid reshuffling is that the Handshaking expression maintains the handshaking protocols on L and R. That is, the projection on the L channel is $*[[L]; L^a\uparrow; [\neg L]; L^a\downarrow]$ and the projection on the R channel is $*[[\neg R^a]; R\uparrow; [R^a]; R\downarrow]$. In addition, the number of completed L↑ minus the number of completed R↑ (the slack of the buffer) should be at least zero to conserve the number of tokens in the pipeline. Also, since this is a "buffer", it should introduce some nonzero slack. Hence, the $L^a\uparrow$ should not wait for the corresponding $[R^a]$, or the reshuffling will have zero slack. This is the "constant response time" requirement.

Although these three requirements are sufficient to guarantee a correct implementation, one more is useful. The L and R channels may be expanded to encode data. If the reshuffling moves the R↑ past the corresponding $L^a\uparrow$, then the "L" data would disappear before R↑ is done. The data here is saved in a buffer, here implemented as an internal state variable proportional to the number of bits on R or L. That data would need to be saved in internal state bits, since the L data may disappear as soon as La+ occurs. These additional internal state bits are undesirable, so La↑ will follow R↑.

There are nine valid reshufflings, each labeled below:

$$MSFB \equiv *[[\neg R^a \wedge L]; R\uparrow; ([R^a]; R\downarrow), (L^a\uparrow;[\neg L]; L^a\downarrow)]$$

$$PCFB \equiv *[[\neg R^a \wedge L]; R\uparrow; L^a\uparrow; ([R^a]; R\downarrow), ([\neg L]; L^a\downarrow)]$$

$$PCHB \equiv *[[\neg R^a \wedge L]; R\uparrow; L^a\uparrow; [R^a]; R\downarrow; [\neg L]; L^a\downarrow]$$

$$WCHB \equiv *[[\neg R^a \wedge L]; R\uparrow; L^a\uparrow; [R^a \wedge \neg L]; R\downarrow; L^a\downarrow]$$

$$B1 \equiv *[[\neg R^a \wedge L]; R\uparrow; L^a\uparrow; [R^a \wedge \neg L]; L^a\downarrow; R\downarrow]$$

$$B2 \equiv *[[\neg R^a \wedge L]; R\uparrow; L^a\uparrow; [\neg L]; L^a\downarrow; [R^a]; R\downarrow]$$

$$B3 \equiv *[[\neg R^a \wedge L]; R\uparrow; L^a\uparrow; [\neg L]; ([R^a]; R\downarrow), L^a\downarrow]$$

$$B4 \equiv *[[\neg R^a \wedge L]; R\uparrow; L^a\uparrow; [R^a]; R\downarrow, [\neg L]; L^a\downarrow]$$

$$B5 \equiv *[[\neg R^a \wedge L]; R\uparrow; L^a\uparrow; [\neg R^a \wedge L]; R\downarrow, L^a\downarrow]$$

It takes two state variables to implement the MSFB reshuffling. The PCFB, B1, B2, B3, B4, and B5 reshufflings all require one state variable en (short for enable) with en ↓ inserted after $L^a\downarrow$ and en↑ inserted before the end.

Selection of which of these reshufflings is the best can assume that the goal is fewer transistors and faster operation. By that metric, the present inventors believe that B3, B4, and B5 are always inferior to PCFB. They all require the same state variable. They produce only a subset of the trade-off PCFB, with additional waits that may be unnecessary. These waits add extra transistors and slow the circuit down, compared to PCFB. They also slow the circuit down as compared with PCFB, which adds extra transistors.

B1 and B2 are also very similar to PCFB, except they have more sequencing. However, that extra sequencing simplifies the production rule for en: to ¬R→en↑ instead of ¬R ¬$L^a$→en↑, in the case of PCFB. The inventors therefore do not believe that these will always be inferior to PCFB. However, due to the extra sequencing and additional transistors elsewhere, these reshufflings will likely seldom, if ever, be better than PCFB.

The MSFB has the least possible sequencing of any of these reshufflings. However, MSFB requires two state variables and has more complicated production rules than PCFB. It has a possible advantage in speed since it allows R↓ to happen a little earlier. If one counts transitions, it turns out that the next buffer in the pipeline (if it is reshuffled similarly) will not even raise $R^a$ until after $L^a\downarrow$ occurs. This might not really be an advantage at all.

That leaves three most interesting reshufflings, WCHB, PCHB, and PCFB. The names are derived from characteristics of the circuit implementations. WC indicates weak-condition logic. PC indicates precharge logic. HB indicates a halfbuffer (slack ½), and FB indicates a fullbuffer (slack 1).

In the halfbuffer reshufflings, only every other stage can have a token on its output channel, since a token on that channel blocks the previous stage from producing an output token. In practice, each of these reshufflings has advantages for certain applications, so they are all useful. With state variables inserted, the three best reshufflings are:

$$PCFB \equiv *[[\neg R^a \wedge L]; R\uparrow; L^a\uparrow; en\downarrow([R^a]; R\downarrow), ([\neg L]; L^a\downarrow); en\uparrow]$$

$$PCHB \equiv *[[\neg R^a \wedge L]; R\uparrow; L^a\uparrow; [R^a]; R\downarrow; ([\neg L]; L^a\downarrow)]$$

$$WCHB \equiv *[[\neg R^a \wedge L]; R\uparrow; L^a\uparrow; [R^a \wedge \neg L]; R\downarrow; L^a\downarrow].$$

Note that the first three parts of the reshuffling are the same.

Figure 1A:
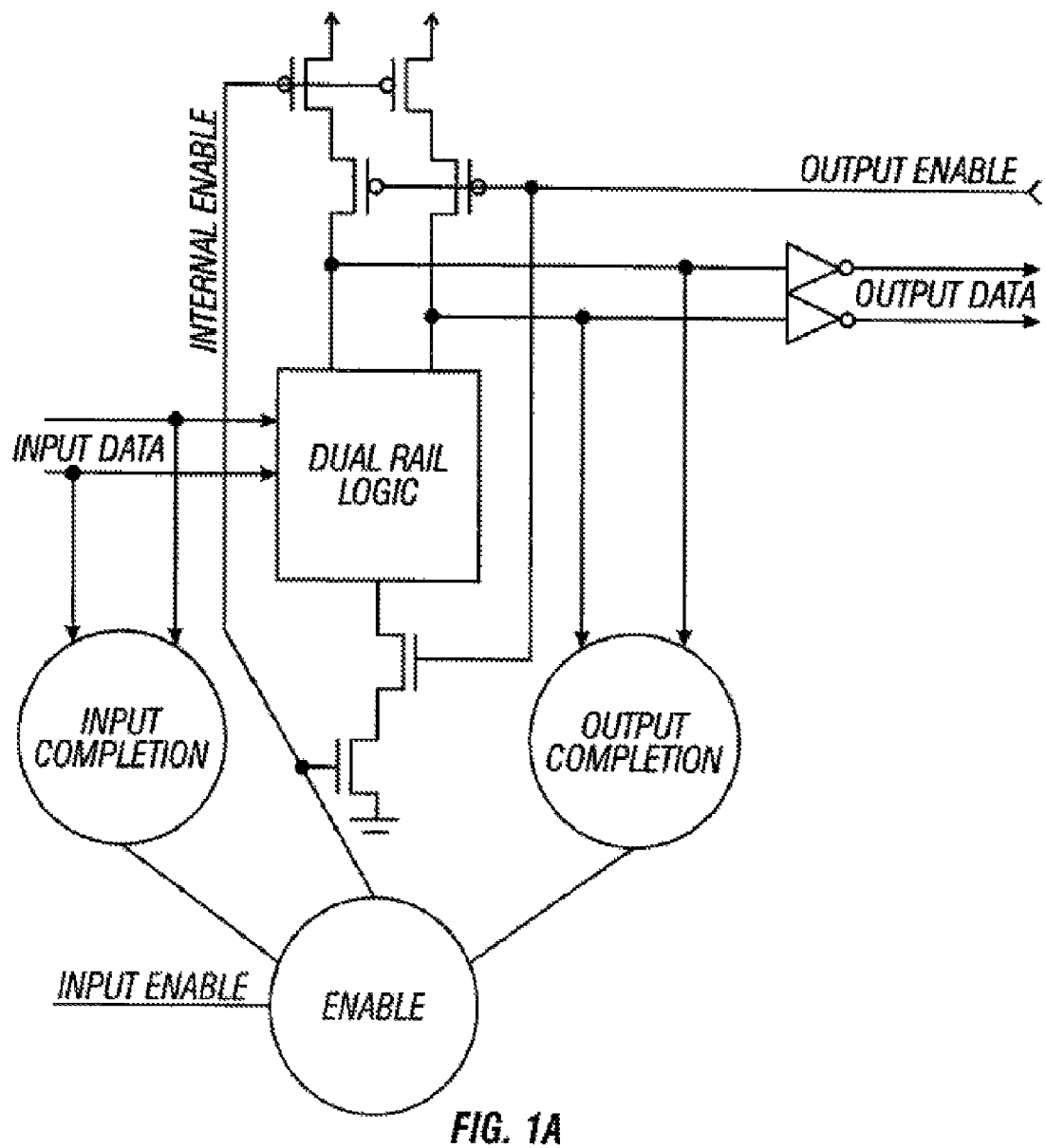
FIG. 1A shows a basic precharge type buffer in block diagram form.

FIG. 1A shows a box and arrow diagram of the standard components of a PCHB or PCFB cell. The various parts of the circuit may be thought of as logic, input completion, output completion, and enable generation. The logic is shown as precharge dual rail domino logic with two enabling gates, the internal enable and the output enable coming back from the next cell in the pipeline. The inverted logic is followed by inverters to restore it to the normal sense. The completion circuits are standard NOR or NAND gates and C-element trees which compute the validity of the inputs and the validity of the outputs. Finally, the "enable" circuit generates the input acknowledge(s) and the internal enable (en) of the cell. The PCHB and PCFB differ only in the exact implementation of this enable circuit.

Logic with Buffering

Suppose it is desired to implement a unit with CSP of the form:

P≡*[A?a,B?b, . . . ;X!f(a,b, . . . ),Y!g(a,b, . . . ), . . . ] where A?a means receive data a on channel A and y!g means send data g on channel y.

On each cycle, P receives some inputs, then sends out functions computed from these inputs. The channels A, B, X, and Y must encode some data. The usual way to do this is using sets of 1-of-N rails for each channel. For instance, to send two bits, one could use two 1-of-2 rails with one acknowledge, or one 1-of-4 rails with one acknowledge.

As a notational convention, a rail is identified by the channel name with a superscript for the 1-of-N wire which is active, and a subscript for what group of 1-of-N wires it belongs to (if there is more than one group in the channel). The corresponding acknowledge will be the channel name with a "a" superscript, or an "e" superscript if it is used in the inverted sense.

As in the single rail buffer case, P could be implemented by expanding each channel communication into a handshaking expansion. Direct implementation of this handshaking expansion requires state variables for the a, b variables and more. It could produce an enormously big and slow circuit. Some reshuffling is desired. The PCFB, PCHB, and WCHB reshufflings will be the most useful ones.

The correspondence between the single rail "templates" for PCFB, PCHB, and WCHB and a process like P is as follows. The L and $L^a$ represent all the input data and acknowledges. The R and $R^a$ represent all the output data and acknowledges. [L] indicates a wait for the validity of all inputs, and [¬L] indicates a wait for the neutrality of all inputs. [¬R] indicates a wait for all the output acknowledges to be false, and [$R^a$] indicates a wait for all the output acknowledges to be true. $L^a\uparrow$ indicates making true all the input acknowledges in parallel, and $L^a\downarrow$ indicates making them false. R↑ means that all the outputs are set to their valid states in parallel. R↓ means that all the outputs are set to their neutral states. When R↑ occurs, it means that particular rails of the outputs are made true, depending on which rails of L are true. This expands R↑ into a set of exclusive selection statements executing in parallel.

Unfortunately, the inventors have recognized that this simple translation may introduce more sequencing than necessary. Of the various actions which occur in parallel like setting all the outputs valid (R↑), each action might need to wait for only a portion of the preceding guard ([¬$R^a$¬L]). For instance, raising $X^0$↑ or $X^1$↑ needs to check [¬Xa] but not [¬Ya]. Similarly, the semicolons between actions (R↑; $L^a$↑) might also over sequence. However, this cannot be easily fixed while still using the Handshaking expansion language. For instance, in the sequence X↑, Y↑; $A^a$↑, $B^a$↑, it might be necessary for $A^a$↑ to wait for [X] only (if Y↑ did not use the value of A) while $B^a$↑ tmight need to wait for [X¬Y]. This case could be written as X↑, Y↑, [X]; $A^a$↑),[X¬Y]; $B^a$↑). However, this may make the written software more difficult to understand. If the next actions are not fully sequenced, it could get even worse. In the limit, the Handshaking expansion just mirrors the actual production rule set (PRS). To skirt the issue, Handshaking expansion can be used. This might be a bit over sequenced, with the understanding that the unnecessary sequencing will be optimized out in the compilation to production rules.

The PCFB version of a P with dual rail channels would therefore be:

$$*[[\neg X^a \wedge f^0(A, B, \ldots) \to X^0\uparrow \| \neg X^a \wedge f^1(A, B, \ldots) \to X^1\uparrow], [$$
$$\neg Y^a \wedge g^0(A, B, \ldots) \to Y^0\uparrow \| \neg Y^a \wedge g^1(A, B, \ldots) \to Y^1\uparrow],$$
$$\ldots ; A^a\uparrow, B^a\uparrow, \ldots ;$$
$$en\downarrow;[X^a \to X^0\downarrow, X^1\downarrow], [Y^a \to Y^0\downarrow, Y^1\downarrow], \ldots ,$$
$$[\neg A^0 \wedge \neg A^1 \to A^a\downarrow], [\neg B^0 \wedge \neg B^1 \to B^a\downarrow], \ldots ; en\uparrow]$$

In this Handshaking expansion, the $f^0, f^1, g^0$, and $g^1$ are boolean expansions in the data rails of the input channels. They are derived from the f and g of the CSP and indicate the conditions for raising the various data rails of the output channels. Note that each output channel waits only for its own acknowledge, which is less sequenced than a direct translation of the PCFB template would be.

In P it is seen that $A^a$ and $B^a$ tend to switch at about the same time. They could actually be combined into a single $AB^a$ which would wait for the conjunction of the guards on $A^a$ and $B^a$. Combining the acknowledges tends to reduce the area of the circuit, but might slow it down. The best decision depends on the circumstances.

Examples of Logic with Buffering

To put the previous section into practice, several CSP processes with the same form as P are compiled into pipelined circuits. The simplest CSP buffer that encodes data has a dual rail input L, and a dual rail output R. The CSP is *[L?x;R!x]. Three Handshaking expansion reshufflings for this process are:

$$WCHB\_BUF \equiv *[[\neg R^a \wedge L^0 \to R^0\uparrow \| \neg R_a \wedge L^1 \to R^1\uparrow]; L^a\uparrow;$$
$$[R^a \wedge \neg L^0 \wedge L^1 \to R^0\downarrow, R^1\downarrow]; L^a\downarrow],$$

$$PCHB\_BUF \equiv *[[\neg R^a \wedge L^0 \to R^0\uparrow \| \neg R_a \wedge L^1 \to R^1\uparrow]; L^a\uparrow;$$
$$[R^a \to R^0\downarrow, R^1\downarrow];[\neg L^0 \wedge \neg L^1 \to L^a\downarrow]],$$

-continued $$PCFB\_BUF \equiv *[\neg R^a \wedge L^0 \to R^0 \uparrow \| \neg R^a \wedge L^1 \to R^1 \uparrow]; L^a \uparrow; en \downarrow;$$
$$[R^a \to R^0 \downarrow, R^1 \downarrow], [\neg L^0 \wedge \neg L^1 \to L^a \downarrow]; en \uparrow].$$

Figure 2:
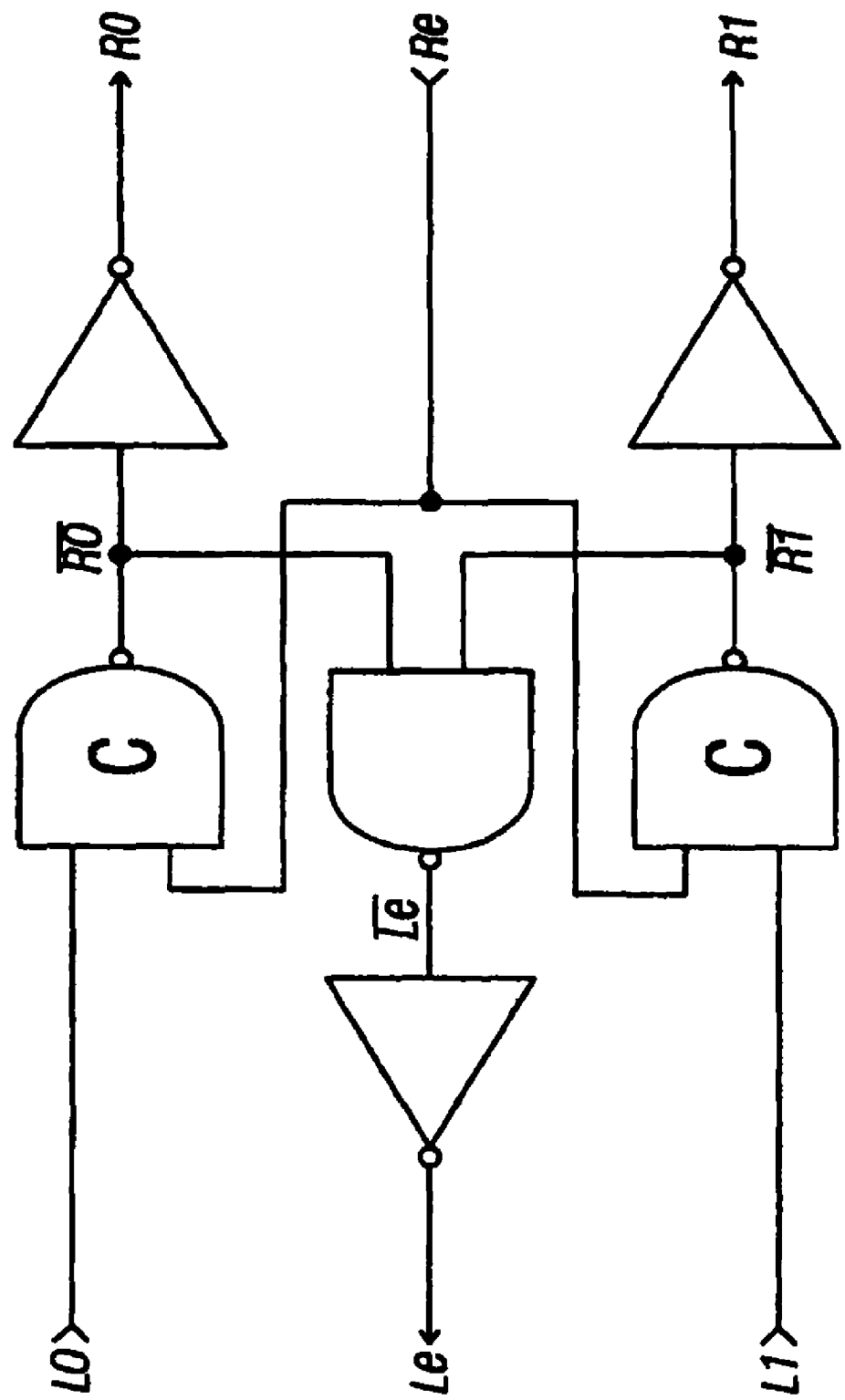
FIG. 2 shows a basic weak condition half buffer circuit.

After bubble-reshuffling (which suggests using the inverted acknowledges, $L^e$ and $R^e$), the production rules for the WCHB-BUF follow. The circuit diagram for a WCHB is shown in FIG. 2.

$R^e \neg L^0 \to \overline{R^0} \downarrow,$ $L^e \neg L^1 \to \overline{R^1} \downarrow,$ $\overline{R^0} \to R^0 \uparrow,$ $\overline{R^1} \to R^1 \uparrow,$ $\overline{R^0} \neg \overline{R^1} \to \overline{L^e} \uparrow,$ $\overline{L^e} \to L^e \downarrow,$ $\neg R^e \neg L^0 \to \overline{R^0} \uparrow,$ $\neg R^e \neg L^1 \to \overline{R^1} \uparrow,$ $R^0 \to R^0 \downarrow,$ $R^1 \to R^1 \downarrow,$ $R^0 \neg R^1 \to \overline{L^e} \downarrow,$ and $\neg \overline{L^e} \to L^e \uparrow$ The other Handshaking expansions can be implemented similarly, but they are both somewhat bigger. For this reshuffling, the validity and neutrality of the output data R implies the neutrality of the input data L. Logic which has this property is called "weak-condition". It means that the L does not need to be checked anywhere else, besides in R. The WCHB also gets some of its semicolons implemented for free. The semicolon between $L^a \uparrow$; $[R^a \neg L]$ is implemented by the environment, as is the implicit semicolon at the end of the loop. The WCHB has some inherent benefits. However, it turns out that although WCHB works well for buffers, the "weak-condition" requirement can cause problems with other circuits.

This WCHB_BUF bubble-reshuffling has 2 transitions forward latency and 3 transitions "backward" latency (for the path from the right acknowledge to the left acknowledge). Combining these times for the whole handshake yields 2+3+2+3=10 transitions per cycle.

Extra inverters can be added to WCHB_BUF to get 10 transitions per cycle. These inverters can actually speed up the throughput, despite the increased transition count, because inverters have high gain. Also, the 6 transitions per cycle buffer would invert the senses of the data and acknowledges after every stage, which is highly inconvenient when composing different pipelined cells. As a standard practice, most pipelined logic cells will be done with 2 transitions of forward latency, but more complicated circuits will have 5, 7 or even 9 transitions backward latency, yielding transitions per cycle from 10 to 22 (even numbers only, of course).

Next consider a full adder, with the CSP *[A?a, B?b, C?c; S!XOR(a,b,c), D!MAJ(a,b,c)]. The A,B,C,S and D channels are dual rail. The acknowledges for A,B, and C are combined into a single $F^e$. Inverted acknowledges are used from the start. The three Handshaking expansion reshufflings are:

$$WCHB\_FA \equiv *[[S^e \wedge XOR^0(A, B, C) \to S^0 \uparrow \|$$
$$S^e \wedge XOR^1(A, B, C) \to S^1 \uparrow],$$
$$[D^e \wedge MAJ^0(A, B, C) \to D^0 \uparrow \|$$
$$D^e \wedge MAJ^1(A, B, C) \to D^1 \uparrow];$$
$$F^e \downarrow;$$
$$[\neg S^e \wedge \neg A^0 \wedge \neg A^1 \wedge \neg C^0 \to S^0 \downarrow, S^1 \downarrow],$$
$$[\neg D^e \wedge \neg B^0 \wedge \neg B^1 \wedge \neg C^1 \to D^0 \downarrow, D^1 \downarrow],$$
$$F^e \uparrow,],$$

$$PCHB\_FA \equiv *[[S^e \wedge XOR^0(A, B, C) \to S^0 \uparrow \|$$
$$S^e \wedge XOR^1(A, B, C) \to S^1 \uparrow],$$
$$[D^e \wedge MAJ^0(A, B, C) \to D^0 \uparrow \|$$
$$D^e \wedge MAJ^1(A, B, C) \to D^1 \uparrow];$$
$$F^e \downarrow;$$
$$[\neg S^e \to S^0 \downarrow, S^1 \downarrow],$$
$$[\neg D^e \to D^0 \downarrow, D^1 \downarrow],$$
$$[\neg A^0 \wedge \neg A^1 \wedge \neg B^0 \wedge \neg B^1 \wedge \neg C^0 \wedge \neg C^1 \to F^e \uparrow]$$

$$PCFB\_FA \equiv *[[S^e \wedge XOR^0(A, B, C) \to S^0 \uparrow \|$$
$$S^e \wedge XOR^1(A, B, C) \to S^1 \uparrow],$$
$$[D^e \wedge MAJ^0(A, B, C) \to D^0 \uparrow \|$$
$$D^e \wedge MAJ^1(A, B, C) \to D^1 \uparrow];$$
$$F^e \downarrow;$$
$$en \downarrow;$$
$$[\neg S^e \to S^0 \downarrow, S^1 \downarrow],$$
$$[\neg D^e \to D^0 \downarrow, D^1 \downarrow],$$
$$[\neg A^0 \wedge \neg A^1 \wedge \neg B^0 \wedge \neg B^1 \wedge \neg C^0 \wedge \neg C^1 \to F^e \uparrow];$$
$$en \uparrow$$
].

In the WCHB_FA, the validity of the outputs S and D implies the validity of the inputs, because the S must check all of A,B, and C. The test for the neutrality of the inputs is split between S↓ and D↓. This works as long as both S↓ and D↓ check at least one input's neutrality completely, and both rails of S and D wait for the same expansion. In both PCHB_FA and PCFB_FA, the expansion for the neutrality of the inputs is obviously too large to implement as a single production rule. Instead, the neutrality test must be decomposed into several operators. The usual decomposition is "nor" gates for each dual rail input, followed by a 3-input c-element. $F^e \downarrow$ must now wait for the validity of the inputs just to acknowledge the internal transitions. However, this means the logic for S and D no longer needs to fully check validity of the inputs; it is not required to be weak-condition.

Figure 3:
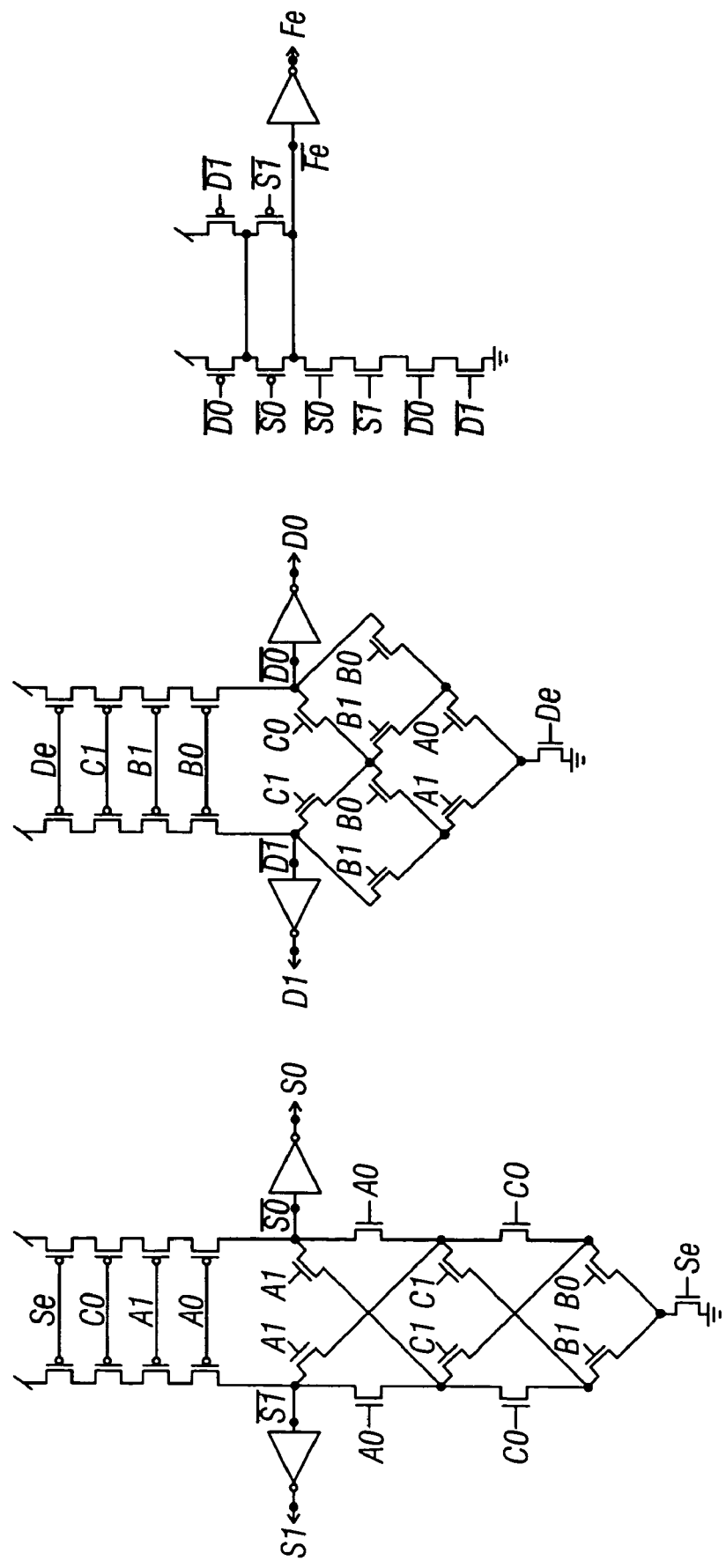
FIG. 3 shows the transistor diagrams for the weak condition half buffer.

The bubble-reshuffled and decomposed production rules for WCHB_FA are:

$S^e \neg XOR^0(A,B,C) \to \overline{S^0} \downarrow$ $S^e \neg XOR^1(A,B,C) \to \overline{S^1} \downarrow$ $D^e \neg MAJ^0(A,B,C) \to \overline{D^0} \downarrow$ $D^e \neg MAJ^1(A,B,C) \to \overline{D^1} \downarrow$ $\overline{S^0} \to S^0 \uparrow$ $\overline{S^1} \to S^1 \uparrow$ $\neg \overline{D^0} \to D^0 \uparrow$ $\neg \overline{D^1} \to D^1 \uparrow$ $(\neg \overline{S^0} \neg \overline{S^1}) \wedge (\neg \overline{D^0} \neg \overline{D^1}) \to \overline{F^e} \uparrow$ $\overline{F^e} \to F^e \downarrow$ $\neg S^e \neg A^0 \neg A^1 \neg C^0 \to \overline{S^0} \uparrow$ $\neg S^e \neg A^0 \neg A^1 \neg C^0 \to \overline{S^1} \uparrow$ $\neg D^e \neg B^0 \neg B^1 \neg C^1 \to \overline{D^0} \uparrow$ $\neg D^e \neg B^0 \neg B^1 \neg C^1 \to \overline{D^1} \uparrow$ $S^0 \to S^0 \downarrow$ $S^1 \to S^1 \downarrow$ $D^0 \to D^0 \downarrow$ $D^1 \to D^1 \downarrow$ $\overline{S^0}\,\overline{S^1}\,\overline{D^0}\,\overline{D^1} \to \overline{F^e} \downarrow$ $\neg \overline{F^e} \to F^e \uparrow$ The circuit diagram is shown in FIG. 3. The pull-up logic for S0, $S^1$, $D^0$, and $D^1$ has 4 P-type transistors in series. This can be quite weak, due to the lower mobility of holes. Other WCHB circuits can be even worse. Since all the inputs are checked for neutrality before the outputs reset, a process with three inputs and only one output would end up with 7 p-transistors in series to reset that output.

Figure 4:
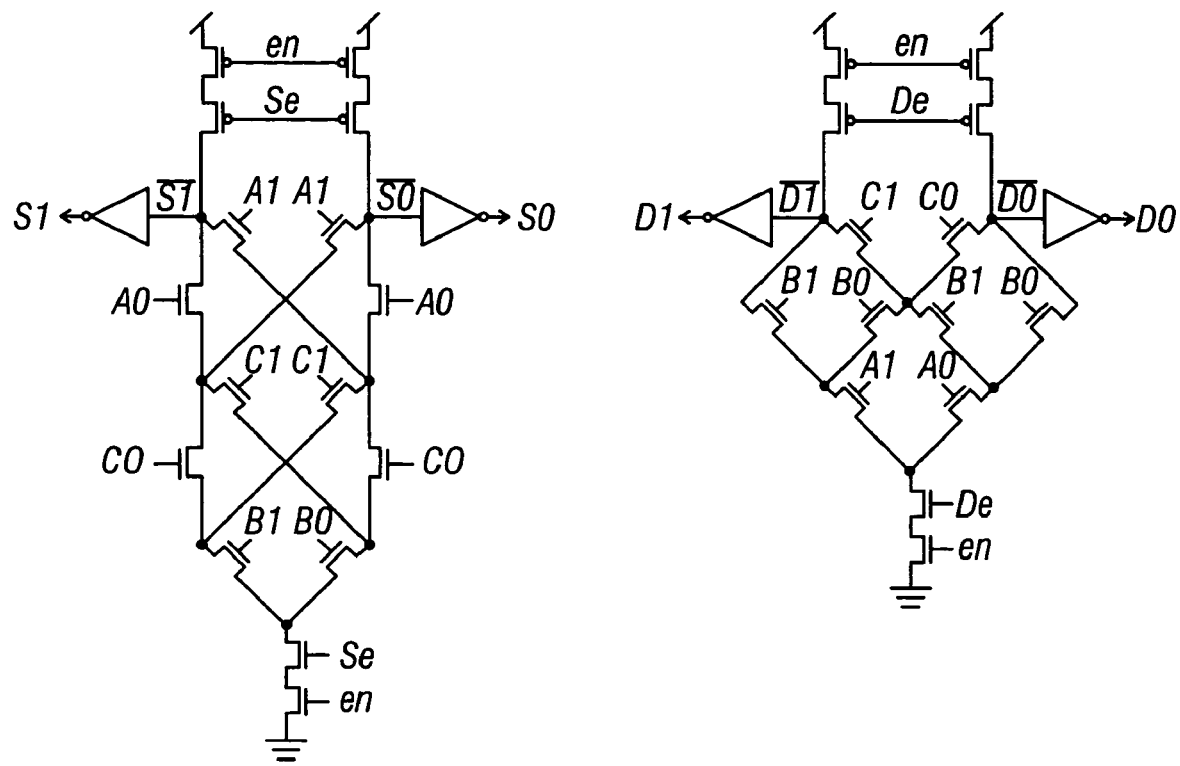
FIG. 4 shows a precharge buffer, with the transistor arrangement at the top; and the gate arrangement at the bottom.
Figure 4:
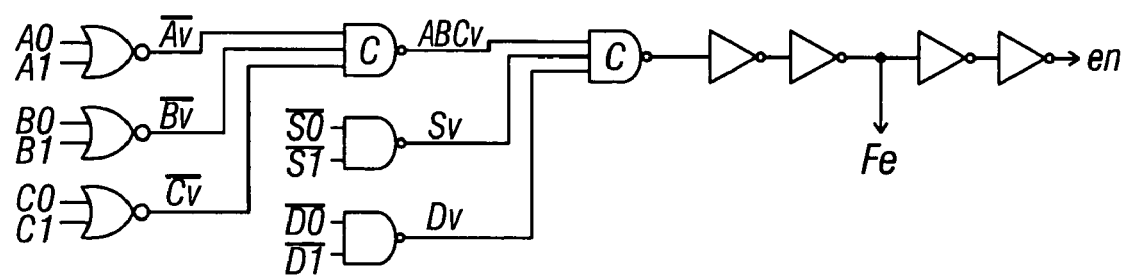

The present systems uses the "precharge-logic" reshufflings, PCHB_FA or PCFB_FA. These test the neutrality of the inputs in a different place, which is more easily decomposed into manageable gates, and does not slow the forward latency. The PCHB_FA reshuffling has the production rules:

$A^0 \neg A^1 \to \underline{A^v} \downarrow$ $B^0 \neg B^1 \to \underline{B^v} \downarrow$ $C^0 \neg C^1 \to \underline{C^v} \downarrow$ $F^e \neg S^e \neg XOR^0(A,B,C) \to \overline{S^0} \downarrow$ $F^e \neg S^e \neg XOR^1(A,B,C) \to \overline{S^1} \downarrow$ $F^e \neg D^e \neg MAJ^0(A,B,C) \to \overline{D^0} \downarrow$ $F^e \neg D^e \neg MAJ^1(A,B,C) \to \overline{D^1} \downarrow$ $\neg \overline{S^0} \to S^0 \uparrow$ $\neg \overline{S^1} \to S^1 \uparrow$ $\neg \overline{D^0} \to D^0 \uparrow$ $\neg \overline{D^1} \to D^1 \uparrow$ $\neg \overline{A^v}\,\neg \overline{B^v}\,\neg \overline{C^0} \to ABC^v \uparrow$ $\neg \overline{S^0}\,\neg \overline{S^1} \to S^v \uparrow$ $\neg \overline{D^0}\,\neg \overline{D^1} \to D^v \uparrow$ $S^v\,D^v\,\neg ABC^v \to F^e \downarrow$ $\neg A^0 \neg A^1 \to \overline{A^v} \uparrow$ $\neg B^0 \neg B^1 \to \overline{B^v} \uparrow$ $\neg C^0 \neg C^1 \to \overline{C^v} \uparrow$ $\neg S^e \neg F^e \to \overline{S^0} \uparrow$ $\neg S^e \neg F^e \to \overline{S^1} \uparrow$ $\neg D^e \neg F^e \to \overline{D^0} \uparrow$ $\neg D^e \neg F^e \to \overline{D^1} \uparrow$ $S^0 \to S^0 \downarrow$ $S^1 \to S^1 \downarrow$ $D^0 \to D^0 \downarrow$ $D^1 \to D^1 \downarrow$ $A^v\,B^v\,C^v \to ABC^v \downarrow$ $\overline{S^0}\,\overline{S^1} \to S^v \downarrow$ $\overline{D^0}\,\overline{D^1} \to D^v \downarrow$ $\neg S^v \neg D^v \neg ABC^v \to F^e \uparrow$ This circuit can be made faster by adding two inverters to Fe and then two more to produce the $F^e$ used internally (which is now called en). This circuit is shown in FIG. 4. A PCFB_FA reshuffling would have only slightly different production rules:

| | | |
|---|---|---|
| $A^0 \vee A^1$ | $\to$ | $\overline{A^v} \downarrow$ |
| $B^0 \vee B^1$ | $\to$ | $\overline{B^v} \downarrow$ |
| $C^0 \vee C^1$ | $\to$ | $\overline{C^v} \downarrow$ |
| $F^e \wedge S^e \wedge XOR^0(A, B, C)$ | $\to$ | $\overline{S^0} \downarrow$ |
| $F^e \wedge S^e \wedge XOR^1(A, B, C)$ | $\to$ | $\overline{S^1} \downarrow$ |
| $F^e \wedge D^e \wedge MAJ^0(A, B, C)$ | $\to$ | $\overline{D^0} \downarrow$ |
| $F^e \wedge D^e \wedge MAJ^1(A, B, C)$ | $\to$ | $\overline{D^1} \downarrow$ |
| $\neg \overline{S^0}$ | $\to$ | $S^0 \uparrow$ |
| $\neg \overline{S^1}$ | $\to$ | $S^1 \uparrow$ |
| $\neg \overline{D^0}$ | $\to$ | $D^0 \uparrow$ |
| $\neg \overline{D^1}$ | $\to$ | $D^1 \uparrow$ |
| $\neg \overline{A^v} \wedge \neg \overline{B^v} \wedge \neg \overline{C^v}$ | $\to$ | $ABC^v \uparrow$ |
| $\neg \overline{S^0} \vee \neg \overline{S^1}$ | $\to$ | $S^v \uparrow$ |
| $\neg \overline{D^0} \vee \neg \overline{D^1}$ | $\to$ | $D^v \uparrow$ |
| $S^v \wedge D^v \wedge ABC^v$ | $\to$ | $F^e \downarrow$ |

| | | |
|---|---|---|
| $\neg A^0 \wedge \neg A^1$ | $\to$ | $\overline{A^v} \uparrow$ |
| $\neg B^0 \wedge \neg B^1$ | $\to$ | $\overline{B^v} \uparrow$ |
| $\neg C^0 \wedge \neg C^1$ | $\to$ | $\overline{C^v} \uparrow$ |
| $\neg S^e \wedge \neg F^e$ | $\to$ | $\overline{S^0} \uparrow$ |
| $\neg S^e \wedge \neg F^e$ | $\to$ | $\overline{S^1} \uparrow$ |
| $\neg D^e \wedge \neg F^e$ | $\to$ | $\overline{D^0} \uparrow$ |
| $\neg D^e \wedge \neg F^e$ | $\to$ | $\overline{D^1} \uparrow$ |
| $\overline{S^0}$ | $\to$ | $S^0 \downarrow$ |
| $\overline{S^1}$ | $\to$ | $S^1 \downarrow$ |
| $\overline{D^0}$ | $\to$ | $D^0 \downarrow$ |
| $\overline{D^1}$ | $\to$ | $D^1 \downarrow$ |
| $\overline{A^v} \wedge \overline{B^v} \wedge \overline{C^v}$ | $\to$ | $ABC^v \downarrow$ |
| $\overline{S^0} \wedge \overline{S^1}$ | $\to$ | $S^v \downarrow$ |
| $\overline{D^0} \wedge \overline{D^1}$ | $\to$ | $D^v \downarrow$ |
| $\neg S^v \wedge \neg D^v \wedge \neg ABC^v$ | $\to$ | $F^e \uparrow$ |

Comparing the three fulladder reshufflings, the WCHB_FA has only 10 transitions per cycle, while the PCHB_FA has 14 and the PCFB_FA has 12 (7 on the setting phase, but 5 on the resetting phase, since the L and R handshakes reset in parallel). Although the WCHB_FA has fewer transistors, to make it reasonably fast, the 4 P-transistors in series must be made very large. Despite the lower transition count of tile WCHB_FA, both PCHB_FA and PCFB_FA are substantially faster in throughput and latency. PCFB_FA is the fastest of all, since it relies heavily on n-transistors and saves 2 transitions on the reset phase. However PCFB_FA can be larger than PCHB_FA, due to the extra state variable en and the extra completion $SD^v$ If the speed of the fulladder is not critical, the PCHB FA seems to be the best choice.

In general, the WCHB reshuffling tends to be best only for buffers and copies ([L?x;R!x,S!x]). The PCHB is the workhorse for most applications; it is both small and fast. When exceptional speed is called for, the PCFB dominates. It is also especially good at completing 1-of-N codes where N is very large, since the completion can be done by a circuit which looks like a tied-or pulldown as opposed to many stages of combinational logic. The reshuffling can actually be mixed together, with each channel in the cell using a different one. This is most commonly useful when a cell computes on some inputs using PCHB, but also copies some inputs directly to outputs using WCHB. In this case, the neutrality detection for the WCHB outputs is only one p-gate, which is no worse than an extra en gate.

Another common class of logic circuits use shared control inputs to process multi-bit words. This is similar to a fulladder. The control is just another input, which happens to have a large fallout to many output channels. Since the outputs only sparsely depend on the inputs (usually with a bit to bit correspondence), the number of gates in series in the logic often does not become prohibitive. However, if the number of bits is large e.g., 32, the completion of all the inputs and outputs will take many stages in a c-element tree, which adds to the cycle time, as does the load on the broadcast of the control data. To make high throughput datapath logic, it can be better to break the datapath up into manageable chunks (perhaps 4 or 8 bits), and send buffered copies of the control tokens to each chunk. This cuts down the cycle time, but does not change the high-level meaning, except to introduce extra slack.

Conditionally Producing Outputs

Although the cells discussed in the previous section can be shown to be Turing complete (they can be turned into a Von Neumann state machine, with some outputs fed back through buffers to store state), they are clearly inefficient for many applications. A very useful extension is the ability to skip a communication on a channel on a given cycle. This turns out to require only a few minor modifications to the scheme as presented so far.

Suppose the process completes at most one communication per cycle on the outputs, but always receives all its inputs. The CSP would be:

$$P1 \equiv *[A?a, B?b, \ldots ;$$
$$[do\_x(a, b, \ldots) \to X!f(a, b \ldots)]\square \neg do\_x(a, b, \ldots) \to skip],$$
$$[do\_y(a, b, \ldots) \to Y!g(a, b \ldots)$$
$$\square \neg do\_y(a, b, \ldots) \to skip], \ldots]$$

As above, this can reshuffle like WCHB, PCHB, or PCFB. The selection statements for the outputs expand into exclusive selections for setting the output rails, plus a new case for producing no output at all on the channel. A dual-rail version of P1 with a PCFB reshuffling is:

$$*[[do\_x(A, B, \ldots) \wedge \neg X^a \wedge f^0(A, B, \ldots) \to X^0 \uparrow$$
$$\square do\_x(A, B, \ldots) \wedge \neg X^a \wedge f^1(A, B, \ldots) \to X^1 \uparrow$$

-continued $$\square \neg do\_x(A, B, \ldots) \to skip],$$
$$[do\_y(A, B, \ldots) \wedge \neg Y^a \wedge g^0(A, B, \ldots) \to Y^0 \uparrow$$
$$\square do\_y(A, B, \ldots) \wedge \neg Y^a \wedge g^1(A, B, \ldots) \to Y^1 \uparrow$$
$$\square \neg do\_y(A, B, \ldots) \to skip], \ldots ;$$
$$A^a \uparrow, B^a \uparrow, \ldots ;$$
$$en \downarrow;$$
$$[X^a \vee \neg X^0 \wedge \neg X^1 \to X^0 \downarrow, X^1 \downarrow],$$
$$[Y^a \vee \neg Y^0 \wedge \neg Y^1 \to Y^0 \downarrow, Y^1 \downarrow], \ldots ,$$
$$[\neg A^0 \wedge \neg A^1 \to A^a \downarrow], [\neg B^0 \wedge \neg B^1 \to B^a \downarrow], \ldots ; en \uparrow]$$

Note that the resetting of the output channels X and Y must accommodate the cases when those channels were not used. Since they produce no outputs, they must not wait for the acknowledges. Adding in the $\neg X^0 \neg X^1$ terms will allow the wait to be completed vacuously. This does not actually generate any production rules. This Handshaking expansion can be compiled into production rules, but there are some tricky details.

An interesting choice arises from the use of the skip. A skip causes no visible change in state, so the next statements in sequence (Aa↑,Ba, . . . ) must actually look directly at the boolean expansion for ¬do_x(A,B, . . . ) and ¬do_y(A,B, . . . ) in addition to the output rails $X^0$, $X^1$, $Y^0$, $Y^1$.

The completion condition for setting the outputs would be en¬($X^0 \neg X^1 \neg$do_x(A,B, . . . ))¬($Y^0 \neg Y^1 \neg$do_y(A,B, . . . )). However, this expansion cannot be used directly in the guards for $A^a \uparrow$ and $B^a \uparrow$, since if one fired first, it could destabilize the other. (This would work if $A^a$ and $B^a$ were combined into one acknowledge.)

Another approach is to introduce a new variable to represent the ¬do_x and ¬do_y cases. Suppose the skip's are replaced with no_x↑ and no_y↑,respectively, and no_x↓, are added to $X^0 \downarrow$, $X^1 \downarrow$ and no_y↓, to $Y^0 \downarrow$, $Y^1 \downarrow$. Now the production rules are simply produced as if X and Y were 1-of-3 channels instead of 1-of-2, except the extra rail doesn't check the right acknowledge, or, in fact, leave the cell.

Finally, there are many cases were some expansion of the outputs is sufficient to produce the output completion expansion without reference to the inputs. For instance, if one input is used to decide if a certain output is used, but is also copied to another output, the copied output could be used to check the completion of the optional output. Similarly, if two output channels are used exclusively, such that one or the other will be used each cycle, the completion for both is just the or of each one's completion.

To put this discussion into practice, a split is implemented, a fundamental routing process which uses one control input to route a data input to one of two output channels. The simple one-bit CSP is *[S?s, L?x;[¬s→A!x [ ] s→B!x]]. The PCHB reshuffling is:

$$PCHB\_SPLIT \equiv *[[A^e \wedge S^0 \wedge L^0 \to A^0 \uparrow \square A^e \wedge S^0 \wedge$$
$$L^1 \to A^1 \uparrow \square S^1 \to skip],$$
$$[B^e \wedge S^1 \wedge L^0 \to B^0 \uparrow \square B^e \wedge S^1 \wedge$$
$$L^1 \to B^1 \uparrow \square S^0 \to skip];$$

-continued $SL^e \downarrow;$ $[\neg A^e \vee \neg A^0 \wedge \neg A^1 \to A^0 \downarrow, A^1 \downarrow],$ $[\neg B^e \vee \neg B^0 \wedge \neg B^1 \to B^0 \downarrow, B^1 \downarrow];$ $SL^e \uparrow]$ The first two selection statements are known to be finished when $A^0 \neg A^1 \neg B^0 \neg B^1 \neg$ Hence, this will be used as the guard for $SL^e \downarrow$. The bubble-reshuffled production rules are:

$$
\begin{array}{rcl}
S^0 \vee S^1 & \to & \overline{S^v} \downarrow \\
L^0 \vee L^1 & \to & \overline{L^v} \downarrow \\
SL^e \wedge A^e \wedge S^0 \wedge L^0 & \to & \overline{A^0} \downarrow \\
SL^e \wedge A^e \wedge S^0 \wedge L^1 & \to & \overline{A^1} \downarrow \\
SL^e \wedge A^e \wedge S^1 \wedge L^0 & \to & \overline{B^0} \downarrow \\
SL^e \wedge A^e \wedge S^1 \wedge L^1 & \to & \overline{B^1} \downarrow \\
\neg \overline{A^0} & \to & A^0 \uparrow \\
\neg \overline{A^1} & \to & A^1 \uparrow \\
\neg \overline{B^0} & \to & B^0 \uparrow \\
\neg \overline{B^1} & \to & B^1 \uparrow \\
\neg \overline{S^v} \wedge \neg \overline{L^v} & \to & SL^v \uparrow \\
\neg \overline{A^0} \vee \neg \overline{A^1} \vee \neg \overline{B^0} \vee \neg \overline{B^1} & \to & AB^v \uparrow \\
AB^v \wedge SL^v & \to & SL^e \downarrow
\end{array}
$$

$$
\begin{array}{rcl}
\neg S^0 \wedge \neg S^1 & \to & \overline{S^v} \uparrow \\
\neg L^0 \wedge \neg L^1 & \to & \overline{L^v} \uparrow \\
\neg SL^e \wedge \neg A^e & \to & \overline{A^0} \uparrow \\
\neg SL^e \wedge \neg A^e & \to & \overline{A^1} \uparrow \\
\neg SL^e \wedge \neg B^e & \to & \overline{B^0} \uparrow \\
\neg SL^e \wedge \neg B^e & \to & \overline{B^1} \uparrow \\
\overline{A^0} & \to & A^0 \downarrow \\
\overline{A^1} & \to & A^1 \downarrow \\
\overline{B^0} & \to & B^0 \downarrow \\
\overline{B^1} & \to & B^1 \downarrow \\
\overline{S^v} \wedge \overline{L^v} & \to & SL^v \downarrow \\
\overline{A^0} \wedge \overline{A^1} \wedge \overline{B^0} \wedge \overline{B^1} & \to & AB^v \downarrow \\
\neg AB^v \wedge \neg SL^v & \to & SL^e \uparrow
\end{array}
$$

Figure 5:
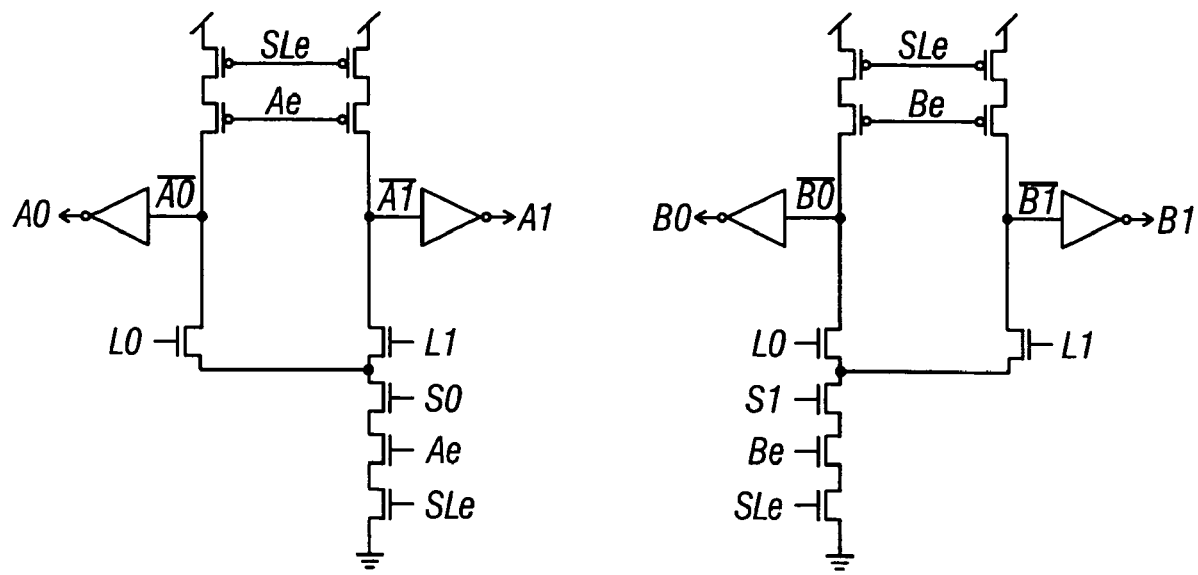
FIG. 5 shows a split precharge circuit.
Figure 5:
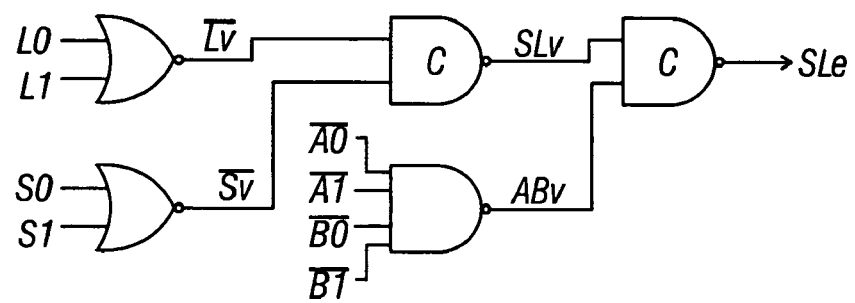

The circuit is shown in FIG. 5.

Conditionally Reading Inputs

It is also highly useful to be able to conditionally read inputs. Normally the condition is read in on a separate unconditional channel, but in general it could be any expansion of the rails of the inputs. A CSP template for type of cell this would be:

$P2 \equiv *[[do\_a(\overline{A}, \overline{B}) \to A?a \square no\_a(\overline{A}, \overline{B}) \to a := \text{"unused"}],$ $[do\_b(\overline{A}, \overline{B}) \to B?b \square no\_b(\overline{A}, \overline{B}) \to b := \text{"unused"}], \ldots;$ $X!f(a, b \ldots), Y!g(a, b \ldots), \ldots$ $]$ The $\overline{A}$ in this context refers to a probe of the value of A, not just its availability. This is not standard in CSP, but is a useful extension which is easily implemented in Handshaking expansion. Basically, the booleans for do_a, do_b, no_a, and no_b may inspect the rails of A and B in order to decide whether to actually receive from the channels. The selection statements will suspend until either do_a or no_a are true. These expansions are required to be stable; that is, as additional inputs show up, they may not become false as a result.

For the Handshaking expansion, instead of assigning "unused" to an internal variable, the f and g expansions examine the inputs directly. The results of the do_a/no_a and do_b/no_b expansions must be latched into internal variables u and v, so that A and B may be acknowledged in parallel without destabilizing the guards of do_a and the like. The PCFB version of the Handshaking expansion is:

$u^0 \downarrow, u^1 \downarrow, v^0 \downarrow, v^1 \downarrow, \ldots;$ $*[[f^0(A, B, \ldots) \to X^0 \uparrow \square f^1(A, B, \ldots) \to X^1 \uparrow],$ $[g^0(A, B, \ldots) \to Y^0 \uparrow \square g^1(A, B, \ldots) \to Y^1 \uparrow], \ldots,$ $[do\_a(A, B) \to u^1 \uparrow \square no\_a(A, B) \to u^0 \uparrow],$ $[do\_b(A, B) \to v^1 \uparrow \square no\_b(A, B) \to v^0 \uparrow], \ldots;$ $[u^1 \to A^a \uparrow \square u^0 \to \text{skip}],$ $[v^1 \to B^a \uparrow \square v^0 \to \text{skip}], \ldots;$ $en \downarrow;$ $[X^a \to X^0 \downarrow, X^1 \downarrow], [Y^a \to Y^0 \downarrow, Y^1 \downarrow], \ldots,$ $(u^0 \downarrow, u^1 \downarrow; [\neg A^0 \wedge \neg A^1 \vee \neg A^e \to A^a \downarrow]),$ $(v^0 \downarrow, v^1 \downarrow; [\neg B^0 \wedge \neg B^1 \vee \neg B^e \to B^a \downarrow]), \ldots;$ $en \uparrow$ $]$ Similarly to the conditional output Handshaking expansion, the guards for $A^a \downarrow$ and $B^a \downarrow$ are weakened to allow the vacuous case. The skip again can pose a problem, since it makes no change in the state. However. with the $u^0$ and $v^0$ variables it is possible to infer the skip and generate the correct guard for en. On the reset phase, the u and v must return to the neutral state. There are several places to put this, but the symmetric placement which sequences them with the $A^a \downarrow$ and $B^a \downarrow$ simplifies the PRS.

In many cases, this general template can be greatly simplified. For instance, if a set of unconditional inputs completely controls the conditions for reading the others, these can be thought of as the "control" inputs. If raising the acknowledges of the various inputs is sequenced so that the conditional ones precede the control ones, then the variables u and v may be eliminated without causing stability problems. Also in some cases the u and v may be substituted with an expansion of the outputs, instead of stored separately.

As a concrete example, the circuit for the merge process reverses the split of the last section by conditionally reading one of two data input channels (A and B) to the single output channel R based on a control input M. The CSP is *[M?m; [¬m→A?x [ ] m→B?x]; X!x]. Here the simplification of acknowledging the data inputs A and B before the control input M is used. The PCHB reshuffling is:

$$\text{PCHB\_MERGE} \equiv *[[X^e \wedge (M^0 \wedge A^0 \vee M^1 \wedge B^0) \longrightarrow X^0 \uparrow \| X^e \wedge$$
$$(M^0 \wedge A^1 \vee M^1 \wedge B^1) \longrightarrow X^1 \uparrow],$$

$$[M^0 \longrightarrow A^e \downarrow \| M^1 \longrightarrow B^e \downarrow];$$

$$M^e \downarrow;$$

$$[\neg X^e \longrightarrow X^0 \downarrow, X^1 \downarrow],$$

$$[\neg A^0 \wedge \neg A^1 \wedge \neg M^0 \vee \neg A^e \longrightarrow A^e \uparrow],$$

$$[\neg B^0 \wedge \neg B^1 \wedge \neg M^0 \vee \neg B^e \longrightarrow B^e \uparrow]$$

$$M^e \uparrow$$

]

A subtle simplification used here is to make $A^e \uparrow$ and $B^e \uparrow$ check the corresponding $\neg M^0$ and $\neg M^1$. This reduces the guard condition for $M^e \uparrow$ and makes the reset phase symmetric with the set phase. Some decomposition is done to add $A^v$, $B^v$ and $X^v$ to do validity and neutrality checks. After bubble-reshuffling, the PRS is:

$$A^0 \vee A^1 \rightarrow \overline{A^v} \downarrow$$
$$B^0 \vee B^1 \rightarrow \overline{B^v} \downarrow$$
$$\neg \overline{A^v} \rightarrow A^v \uparrow$$
$$\neg \overline{B^v} \rightarrow B^v \uparrow$$
$$M^e \wedge X^e \wedge (M^0 \wedge A^0 \vee M^1 \wedge B^0) \rightarrow \overline{X^0} \downarrow$$
$$M^e \wedge X^e \wedge (M^0 \wedge A^1 \vee M^1 \wedge B^1) \rightarrow \overline{X^1} \downarrow$$
$$\neg \overline{X^0} \rightarrow X^0 \uparrow$$
$$\neg \overline{X^1} \rightarrow X^1 \uparrow$$
$$\neg \overline{X^0} \vee \neg \overline{X^1} \rightarrow X^v \uparrow$$
$$A^v \wedge M^0 \wedge X^v \rightarrow A^e \downarrow$$
$$B^v \wedge M^1 \wedge X^v \rightarrow B^e \downarrow$$
$$\neg A^e \vee \neg B^e \rightarrow \overline{M^e} \uparrow$$
$$\overline{M^e} \rightarrow M^e \downarrow$$

$$\neg A^0 \wedge \neg A^1 \rightarrow \overline{A^v} \uparrow$$
$$\neg B^0 \wedge \neg B^1 \rightarrow \overline{B^v} \uparrow$$
$$\overline{A^v} \rightarrow A^v \downarrow$$
$$\overline{B^v} \rightarrow B^v \downarrow$$
$$\neg M^e \wedge \neg X^e \rightarrow \overline{X^0} \uparrow$$
$$\neg M^e \wedge \neg X^e \rightarrow \overline{X^1} \uparrow$$
$$\overline{X^0} \rightarrow X^0 \downarrow$$
$$\overline{X^1} \rightarrow X^1 \downarrow$$
$$\overline{X^0} \wedge \overline{X^1} \rightarrow X^v \downarrow$$
$$\neg A^v \wedge \neg M^0 \wedge \neg X^v \rightarrow A^e \uparrow$$
$$\neg B^v \wedge \neg M^1 \wedge \neg X^v \rightarrow B^e \uparrow$$
$$A^e \wedge B^e \rightarrow \overline{M^e} \downarrow$$
$$\neg \overline{M^e} \rightarrow M^e \uparrow$$

Figure 6:
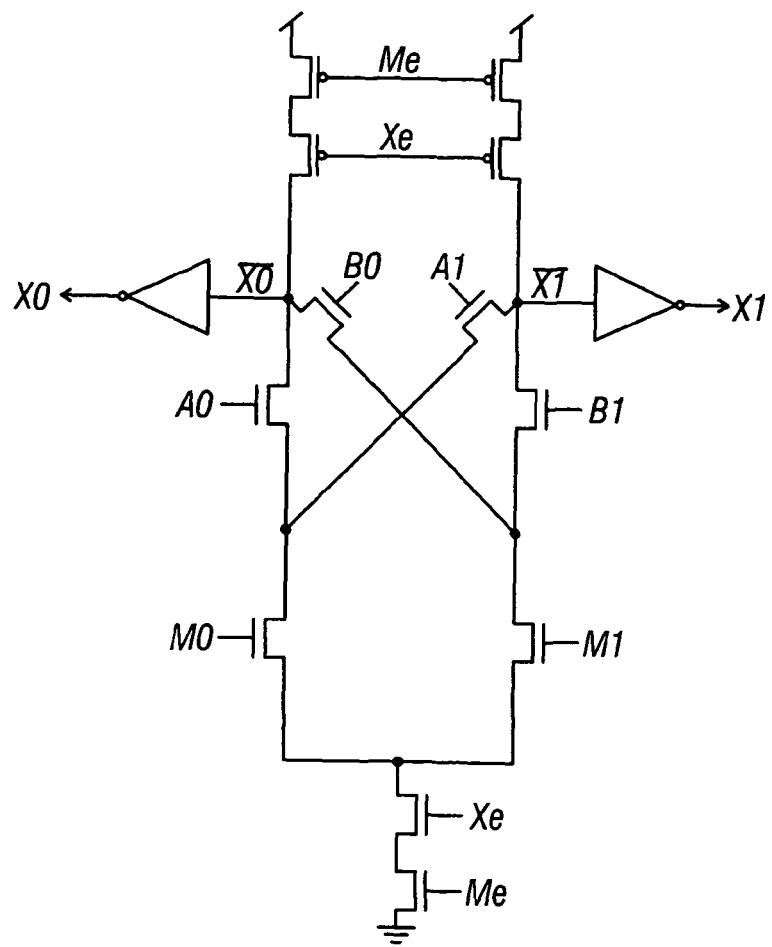
FIG. 6 shows a merge precharge circuit.
Figure 6:
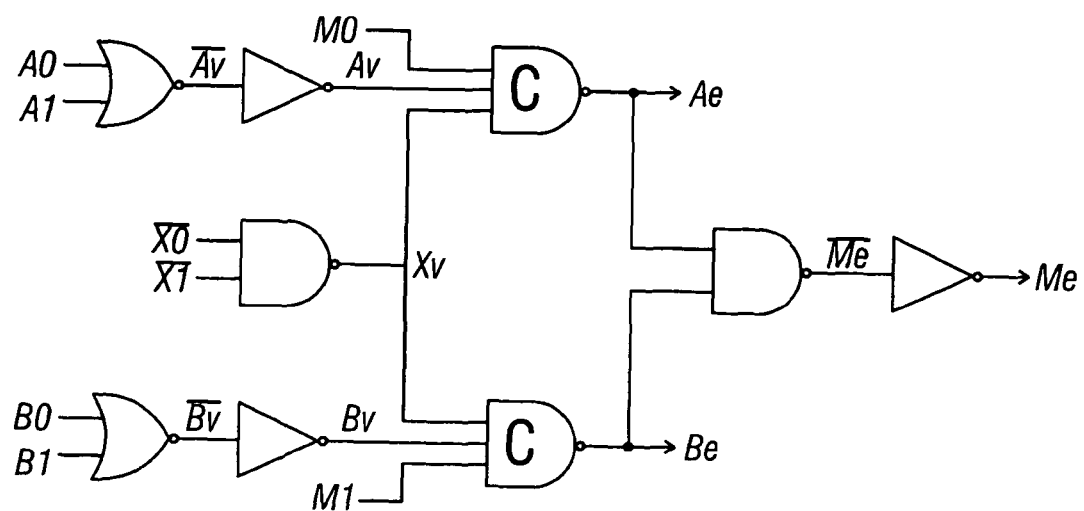

As usual for PCHB reshuffling, of the work is done in a large network of n transistors. The circuit is shown in FIG. 6.

Internal State

Another extension to this design style is the ability to store internal state from one cycle to the next. A CSP template for a state holding process with state variable s is:

$$P3 \equiv s := \text{initial\_s}; *[A?a, B?b, \ldots; X!f(s,a,b,\ldots),$$
$$Y!g(s,a,b,\ldots), \ldots; s := h(s,a,b,\ldots)]$$

This can be implemented in a variety of ways. The simplest, which requires no new circuits, is to feed an output of a normal pipelined cell back around to an input, via several buffer stages. One of these feedback buffers is initialized containing a token with the value of the initial state. Enough buffers must be used to avoid deadlock, and even more are needed to maximize the throughput. Therefore, this solution can be quite large. For control circuitry, where area is less of an issue, this is often adequate. As an added benefit, the feed forward portion of the state machine can be implemented as several sequential stages of pipelined logic, which correspondingly reduces the number of feedback buffers necessary and allows far more complicated functions.

Aside from using feedback buffers, there are three main approaches to retaining state, of increasing generality and complexity. First, pipelining channels by themselves store state. Usually, these values move forward down the pipeline, passing each stage only once. However, if a stage uses but does not acknowledge its input, the input value will still be there on the next cycle. Essentially, the token is stopped and sampled many times. In CSP, this can be expressed with the probe of the value of the channel. A conditional input type of circuit is used, which uses an input to produce outputs without acknowledging that input. This technique can be used for certain problems. For example, a loop unroller could take an instruction on the input channel, and produce many copies of it on an output channel based on a control input. Of course, this type of state variable can never be set, only read one or more times from an input.

If the state variable is exclusively set or used in a cycle, a simple modification of the standard pipelined reshuffling will suffice. The state variable, s is assigned to a dual-rail value at the same time the outputs are produced. On the reset phase, it remains stable. Unlike the usual return-to-zero variables, s will only briefly transition through neutrality between valid states. If s doesn't change, it does not go through a neutral state at all. The CSP for this behavior is expressed just like P3, except the semicolon before the assignment to s is replaced with a comma. This is made possible by the assumption that s only changes when the outputs X and Y do not depend on it; this avoids any stability problems.

The only tricky thing about deriving the Handshaking expansion for this is the assignment statement. Basically, the assignment is done by lowering the opposite rail first, then raising the desired rail. This guarantees that the variable passes through neutral when it changes, and also bubble-reshuffles nicely. The completion detection of this assignment is basically equivalent to checking that the value of s corresponds to the inputs to s. So s:=x becomes $[x^0 \to s^1 \downarrow;$ $s^1 \uparrow [\ ]x^1 \to s^0 \downarrow s^1 \uparrow]; [x^0 \neg s^0 \neg x^1 \neg s^1]$. The PCFB version of the Handshaking expansion for this type of state holding process is:

$$*[[\neg X^a \wedge f^0(s, A, B, \ldots) \to X^0 \uparrow \Box \neg X^a \wedge f^1(s, A, B, \ldots)$$
$$\to X^1 \uparrow],$$
$$[\neg Y^a \wedge g^0(s, A, B, \ldots) \to Y^0 \uparrow \Box \neg Y^a \wedge g^1(s, A, B, \ldots)$$
$$\to Y^1 \uparrow],$$
$$[h^0(A, B, \ldots) \to s^1 \downarrow; s^0 \uparrow \Box h^1(A, B, \ldots) \to s^0 \downarrow; s^1 \uparrow], \ldots;$$
$$A^a \uparrow, B^a \uparrow, \ldots;$$
$$en \downarrow;$$
$$[X^a \to X^0 \downarrow, X^1 \downarrow], [Y^a \to Y^0 \downarrow, Y^1 \downarrow], \ldots,$$
$$[\neg A^0 \wedge \neg A^1 \to A^a \downarrow], [\neg B^0 \wedge \neg B^1 \to B^a \downarrow], \ldots;$$
$$en \uparrow$$
$$]$$

It is often desirable to decompose the completion detection of the state variable into a 4 phase completion variable $s^v$ which detects the completion of the assignment on the set phase and is cleared on the reset phase. This makes it easier to have multiple state variables. One thing to note is that the assignment sequence and completion has 3 transitions if it changes state, and therefore often takes more transitions than a typical output channel. However, on the reset phase or if the state is unchanged, this only takes 1 transition. Another caveat is that the state variable shown here works best for only dual rail 1 bit state variables.

As an example of this type of state variable, consider the "register" process x:=0;*[C?c;[c→R!x[ ]¬c→L?x]]. This uses a control channel C to decide whether to read or write the state bit x via the input and output channels L and R. Obviously, the state bit is exclusively used or set on any given cycle. This process also conditionally communicates on L and R.

The PCHB version of the Handshaking expansion is:

$$\text{PCHB\_REG} \equiv x^0 \uparrow, x^1 \downarrow;$$
$$*[[C^1 \wedge R^e \wedge x^0 \to R^0 \uparrow$$
$$\| C^1 \wedge R^e \wedge x^1 \to R^1 \uparrow$$
$$\| C^0 \wedge L^0 \to x^1 \downarrow; x^0 \uparrow$$
$$\| C^0 \wedge L^1 \to x^0 \downarrow; x^1 \uparrow];$$
$$C^0 \to L^e \downarrow \| C^1 \to \text{skip}];$$

-continued $$C^e \downarrow;$$
$$[\neg R^e \vee \neg R^0 \wedge \neg R^1 \to R^0 \downarrow, R^1 \downarrow];$$
$$[\neg L^0 \wedge \neg L^1 \to L^e \uparrow];$$
$$[\neg C^0 \wedge \neg C^1 \to C^e \uparrow]$$
$$]$$

Figure 7:
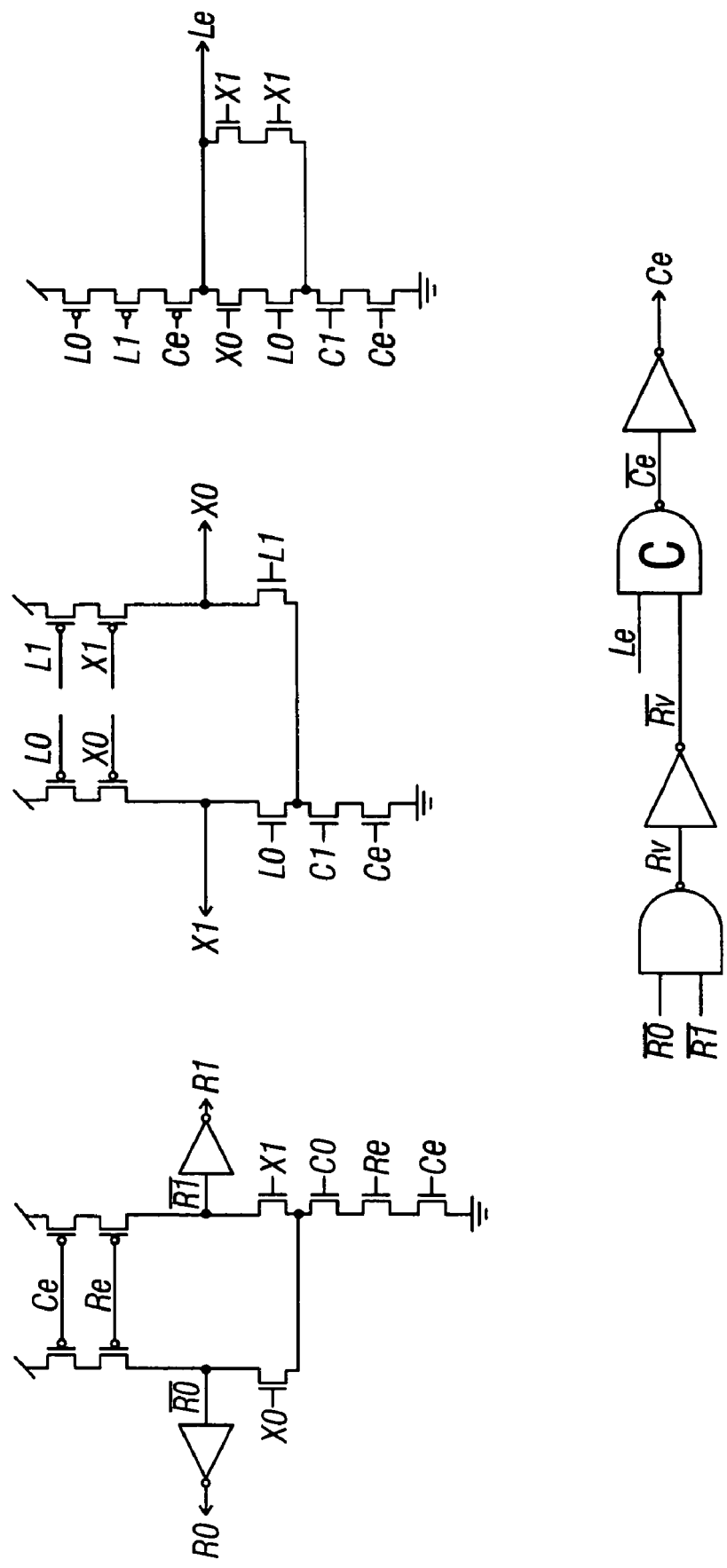
FIG. 7 shows a Reg precharge circuit.

The PRS has a few tricky features. Due to the exclusive pattern of the communications the rules for $C^e$ can be simplified. The decomposed and bubble reshuffled PRS follows. The circuit is shown in FIG. 7.

$$C^e \wedge C^0 \wedge R^e \wedge x^0 \quad \to \quad \overline{R^0} \downarrow$$
$$C^e \wedge C^0 \wedge R^e \wedge x^1 \quad \to \quad \overline{R^1} \downarrow$$
$$\neg \overline{R^0} \quad \to \quad R^0 \uparrow$$
$$\neg \overline{R^1} \quad \to \quad R^1 \uparrow$$
$$\neg \overline{R^0} \vee \neg \overline{R^1} \quad \to \quad R^v \uparrow$$
$$R^v \quad \to \quad \overline{R^v} \downarrow$$
$$C^e \wedge C^1 \wedge L^0 \quad \to \quad x^1 \downarrow$$
$$C^e \wedge C^1 \wedge L^1 \quad \to \quad x^0 \downarrow$$
$$\neg L^0 \wedge \neg x^0 \quad \to \quad x^1 \uparrow$$
$$\neg L^1 \wedge \neg x^1 \quad \to \quad x^0 \uparrow$$
$$C^e \wedge (x^0 \wedge L^0 \vee x^1 \wedge L^1) \quad \to \quad L^e \downarrow$$
$$\neg L^e \vee \neg \overline{R^v} \quad \to \quad \overline{C^e} \uparrow$$
$$\overline{C^e} \quad \to \quad C^e \downarrow$$

$$\neg C^e \wedge \neg R^e \quad \to \quad \overline{R^0} \uparrow$$
$$\neg C^e \wedge \neg R^e \quad \to \quad \overline{R^1} \uparrow$$
$$\overline{R^0} \quad \to \quad R^0 \downarrow$$
$$\overline{R^1} \quad \to \quad R^1 \downarrow$$
$$\overline{R^0} \wedge \overline{R^1} \quad \to \quad R^v \downarrow$$
$$\neg R^v \quad \to \quad \overline{R^v} \uparrow$$
$$\neg C^e \wedge \neg L^0 \wedge \neg L^1 \quad \to \quad L^e \uparrow$$
$$L^e \wedge \overline{R^v} \quad \to \quad \overline{C^e} \downarrow$$
$$\neg \overline{C^e} \wedge \neg C^0 \wedge \neg C^1 \quad \to \quad C^e \uparrow$$

The most general form of state holding cell is one where the state variable can be used and set in any cycle. In order to do this, it is necessary to have separate storage locations for the new state and the old state. This may be done by introducing an extra state variable t which holds the new state until s is used. The CSP for this is:

$$P4 \equiv s := 0;\ *[A?a, B?b, \ldots; X!f(s,a,b, \ldots), Y!g(s,a, b, \ldots), t := h(s,a,b,\ldots), \ldots; s := t]$$

When this is converted into an Handshaking expansion, there are several choices for where to put the assignment s:=t. It works best to do this assignment on the reset phase of the channel handshakes. After the assignment s:=t, t returns to neutral just like a channel. The PCFB version of this type of cell is:

$s := 0;$ $*[[\neg X^a \wedge f^0(s, A, B, \ldots) \rightarrow X^0 \uparrow \square \neg X^a \wedge f^1(s, A, B, \ldots)$
$\rightarrow X^1 \uparrow],$ $[\neg Y^a \wedge g^0(s, A, B, \ldots) \rightarrow Y^0 \uparrow \square \neg Y^a \wedge g^1(s, A, B, \ldots)$
$\rightarrow Y^1 \uparrow],$ $[h^0(s, A, B, \ldots) \rightarrow t^0 \uparrow \square h^1(s, A, B, \ldots) \rightarrow t^1 \uparrow], \ldots;$ $A^a \uparrow, B^a \uparrow, \ldots;$ $en \downarrow;$ $[X^a \rightarrow X^0 \downarrow, X^1 \downarrow], [Y^a \rightarrow Y^0 \downarrow, Y^1 \downarrow], \ldots,$ $[t^0 \rightarrow s^1 \downarrow; s^0 \uparrow; t^0 \downarrow \square t^1 \rightarrow s^0 \downarrow; s^1 \uparrow; t^1 \downarrow], \ldots,$ $[\neg A^0 \wedge \neg A^1 \rightarrow A^a \downarrow], [\neg B^0 \wedge \neg B^1 \rightarrow B^a \downarrow], \ldots;$ $en \uparrow$ $]$ The assignment statements may be compiled into production rules as before. Of special interest is the compilation of the sequence $[t^0 \rightarrow s^1 \downarrow; s^0 \uparrow; t^0 \downarrow [\ ] t^1 \rightarrow s^0 \downarrow; s^1 \uparrow; t^1 \downarrow]$. Due to correlations of the data, this compiles into the simple (bubble-reshuffled) production rules:

$\neg en \wedge \neg \overline{t^0} \quad \rightarrow \quad s^0 \uparrow$ $\neg en \wedge \neg \overline{t^1} \quad \rightarrow \quad s^1 \uparrow$ $s^0 \wedge \overline{t^1} \quad \rightarrow \quad s^1 \downarrow$ $s^1 \wedge \overline{t^0} \quad \rightarrow \quad s^0 \downarrow$ $\neg en \wedge \neg s^1 \quad \rightarrow \quad \overline{t^0} \uparrow$ $\neg en \wedge \neg s^0 \quad \rightarrow \quad \overline{t^1} \uparrow$ The $s^0$ and $s^1$ should also be reset to the correct initial value. The completion of this sequence is just the normal check for to $\overline{t^0}\cdot\overline{t^1}$. If the state variable doesn't change, this sequence takes only 1 transition, since the first 4 rules are vacuous. If the state changes it takes 3 transitions. This is 2 transitions longer than the reset of a normal output channel, so this should be considered to optimize the low level production rule decomposition. This type of structure only works well if s and t are dual-rail, although several dual-rail state variables can be used in parallel to encode more states.

In addition, extensions to these cells which allow for conditionally receiving inputs or conditionally sending outputs were explained. Finally, various approaches to storing internal state in the cells are disclosed.

The prior state of the art was to use un-pipelined weak condition logic. Extra buffers or registers would be added between blocks of logic to add some pipelining. This approach was smaller, but much slower. The extra buffers also increased the forward latency. Essentially, in the limit of using more and more buffers, they should eventually be merged into the logic and all cells should be "maximally" pipelined. That is, any discrete state of logic gets its own pipelining, so that no more slack could be added without just adding excess buffers. In practice, the cost of such fine pipelining amounts to a 50% to 100% increase in area over a completely un-pipelined circuit. It reduces the latency (since no separate buffers are added), and, of course, increases the throughput. At this natural limit of pipelining, all handshakes between neighboring cells require a small number of transmissions per cycle, typically 14 to 18. The internal cycles usually keep up. This yields a very high peak throughput (comparable to 14 transition per cycle hyper-pipelined synchronous designs like the DEC Alpha) but is more easily composable. However, composing fast pipelined cells in various patterns can yield much lower system throughputs unless special care is taken to match the latencies as well as the throughputs of the units.

Several simple modifications to these pipelined circuit templates are also useful and novel.

1. Go Signal

In the PCHB, it is possible to separate out the "en & re" expressions for the logic pulldown and "~en & ~re" for the logic pullup into a 2-input c-element of "en" and "re" which generates a single "go" signal used to precharge and enable the logic. This improves the forward latency and analog safety of the logic, although it adds 4 transitions to the handshake on the output channel.

With more care, this "go" signal may be added to a PCFB as well. In this case, the "go" signal must also be checked before producing the left enables, or instabilities will result. This has the side effect of reducing the slack to one half, but this is irrelevant when the goal is high speed.

When a "go" signal is used with conditional outputs, the "go-" must not wait for the right enable (re) to go down since it won't (as no data was sent on the last cycle). Instead of a c-element this gives the PRS: "en & re & ~no_r->go+" and "~en & (no_r|~re)->go-".

2. Shared Input/Output Completion

In most of these examples, the output completion is taken before the inverters, since this allows the use of a NAND gate instead of a NOR gate and gets the completion done a transition earlier. However, it is possible to complete from after the inverters as well. This is particularly useful when you can share the output completion circuit of one cell with the input completion of the next cell in the pipeline.

3. Timing Assumptions

Although this patent primarily presents asynchronous circuits in a quasi-delay-insensitive framework, it may prove desirable to introduce timing assumptions in order to simplify or speed up the circuit. Several useful non-QDI circuits can be derived simply by omitting transistors from a QDI WCHB, PCHB, or PCFB circuit. It is preferred if the introduced timing assumptions can be met entirely by estimating the delays within the cell, without making assumptions on the delays of its environment. Several simple modifications can satisfy this property.

For example, in a PCFB with a single "go" signal, it can be assumed that the output will precharge quickly after the "go" goes low. The fact that "go" is low can be taken to imply that the output data is precharged, or soon will be. This "implied neutrality" timing assumption can eliminate many transistors of completion detection, and allow the next cycle to begin earlier. In a similar fashion, the input validity can sometimes be ignored if the output validity implies that all input channels are valid.

Of the various types of state-holding cells, the more restricted versions generally have simpler and faster implementations, and should therefore be used if possible. For the most general case, either a pair of state variables should be used, or if area is not an issue, a feedback loop of buffers.

Three main types of handshaking reshuffling have proved superior for different circumstances. The weak-condition half-buffer variety works well for buffers and copies without logic. The precharge-logic half-buffering is the simplest good way to implement most logic cells. The precharge-logic full-buffering has an advantage in speed and is good at decoupling the handshakes of neighboring units. It should be used when necessary to improve the throughput.

Although only a few embodiments have been described in detail above, other embodiments are contemplated by the inventor and are intended to be encompassed within the following claims. In addition, other modifications are contemplated and are also intended to be covered.

What is claimed is:

1. A circuit comprising a plurality of pipeline stages, each of the plurality of pipeline stages comprising:
   at least one asynchronous, delay-insensitive input channel, each input channel being operable to communicate with a preceding one of the pipeline stages by waiting for input data on the input channel, asserting an input acknowledge signal in response to the input data, waiting for the input channel to be set neutral, and deasserting the input acknowledge signal in response to the input channel being set neutral;
   at least one asynchronous, delay-insensitive output channel, each output channel being operable to communicate with a subsequent one of the pipeline stages by waiting for an output acknowledge signal associated with the subsequent pipeline stage to be deasserted, transmitting output data on the output channel in response to deassertion of the output acknowledge signal, waiting for the output acknowledge signal to be asserted, and setting the output channel neutral in response to assertion of the output acknowledge signal;
   input completion circuitry configured to generate an input completion signal indicative of validity of the input data;
   output completion circuitry configured to generate an output completion signal indicative of validity of the output data;
   enable circuitry configured to generate the input acknowledge signal and an internal enable signal using the input completion signal and the output completion signal as input; and
   domino logic configured to compute the output data directly from the input data, the domino logic being configured to hold a state of the output data until reset in response to the output acknowledge signal associated with the subsequent pipeline stage and the internal enable signal.

2. The circuit of claim 1 wherein the input and output channels encode the input and output data using a 1 of N encoding scheme, the 1 of N encoding scheme indicating data validity where one of N rails of a corresponding channel is asserted, and data neutrality where all rails of the corresponding channel are deasserted.

3. The circuit of claim 1 wherein L represents the at least one input channel, $L^a$ represents the input acknowledge signal, R represents the at least one output channel, and $R^a$ represents the output acknowledge signal, and wherein brackets represent waiting for an enclosed expression to become true, arrows represent corresponding transitions of an associated expression, and * signifies repetition of an associated expression, one or more of the pipeline stages being operable to control sequencing of the input and output channels according to one of:
   $*[[\neg R^a \neg L]; R\uparrow; L^a\uparrow; ([R^a]; R\downarrow), ([\neg L]; L^a\downarrow)]$(PCFB), and
   $*[[\neg R^a \neg L]; R\uparrow; L^a\uparrow; [R^a]; R\downarrow; [\neg L]; L^a\downarrow]$(PCHB).

4. The circuit of claim 1 wherein one or more of the pipeline stages comprises one or more of conditional output circuitry operable to determine for a first processing cycle whether and on which of the at least one output channel the output data are transmitted, conditional input circuitry operable to determine for a second processing cycle whether to use and whether to acknowledge the input data on any of the at least one input channel, or state variable circuitry operable to retain at least one internal state bit from a third processing cycle to a fourth processing cycle subsequent to the third processing cycle.

5. The circuit of claim 4 wherein one or more of the pipeline stages comprises the state variable circuitry, the state variable circuitry being operable to retain the at least one internal state bit by feeding an output signal back to an input channel through at least one buffer with an initial data token being generated by a reset signal.

6. The circuit of claim 4 wherein one or more of the pipeline stages comprises the state variable circuitry, the state variable circuitry being operable to retain the at least one internal state bit by using the input data without acknowledging the input channel.

7. The circuit of claim 4 wherein one or more of the pipeline stages comprises the state variable circuitry, the state variable circuitry being operable to retain the at least one internal state bit by using a register which is set by a portion of the domino logic on some processing cycles and employed by output logic on other processing cycles.

8. The circuit of claim 4 wherein one or more of the pipeline stages comprises the state variable circuitry, the state variable circuitry being operable to retain the at least one internal state bit by using first and second registers to hold a new state and an old state, respectively, wherein the new state may be set by a portion of the domino logic during a particular processing cycle during which the old state may be employed by output logic, and wherein the new state replaces the old state in the second register on a precharge half of each processing cycle.

9. The circuit of claim 4 wherein one or more of the pipeline stages comprises the conditional input circuitry, the conditional input circuitry being operable to conditionally generate a conditional acknowledge signal on the input channel in response to a condition signal, the condition signal being generated by a portion of the domino logic.

10. The circuit of claim 4 wherein one or more of the pipeline stages comprises the conditional input circuitry, the conditional input circuitry being operable to conditionally acknowledge the input channel in response to a condition, the condition being computed with reference to at least one additional input or output channel.

11. The circuit of claim 4 wherein one or more of the pipeline stages comprises the conditional output circuitry, the conditional output circuitry being operable to conditionally suppress the output channel in response to a condition signal, the condition signal being generated by a portion of the domino logic.

12. The circuit of claim 4 wherein one or more of the pipeline stages comprises the conditional output circuitry, the conditional output circuitry being operable to conditionally suppress the output channel in response to a condition, the condition being computed with reference to at least one additional input or output channel.

13. The circuit of claim 1 further comprising an additional pipeline stage including domino logic, wherein delay-insensitive operation of the additional pipeline stage with respect to external circuitry is guaranteed providing that at least one internal timing assumption is met, the at least one internal timing assumption comprising assuming precharging of an output portion of the domino logic of the additional pipeline stage after a go signal has been deasserted without requiring explicit completion detection.

14. The circuit of claim 1 wherein delay-insensitive operation of one or more of the pipeline stages with respect to external circuitry is guaranteed provided at least one internal timing assumption is met, the at least one internal timing assumption comprising assuming validity of the input data once at least some of the output data are valid without requiring explicit completion detection.

15. The circuit of claim 1 wherein delay-insensitive operation of one or more of the pipeline stages with respect to external circuitry is guaranteed provided at least one internal timing assumption is met, the at least one internal timing assumption introduced by removing transistors from an otherwise internally delay-insensitive design in which any non-explicitly-completed transitions can be assumed to complete in short enough time to ensure operability with the external circuitry.

16. The circuit of claim 1 wherein the domino logic is operable to be precharged and enabled in response to the output acknowledge signal and an enable signal, the circuit further comprising a gate for combining the output acknowledge signal and the enable signal to generate a go signal, the domino logic being operable to be precharged and enabled in response to the go signal.

* * * * *